United States Patent [19]

Varecka et al.

[11] 4,110,730
[45] Aug. 29, 1978

[54] RATE SENSITIVE SYSTEM FOR A SEISMIC SENSING RANGE CONTAINMENT APPARATUS

[75] Inventors: Charles P. Varecka, Bloomington; Donald M. Merhar, Shorewood, both of Minn.

[73] Assignee: The United States of America as represented by the Secretary of the Army, Washington, D.C.

[21] Appl. No.: 809,270

[22] Filed: Jun. 23, 1977

Related U.S. Application Data

[63] Continuation-in-part of Ser. No. 681,104, Apr. 28, 1976, abandoned.

[51] Int. Cl.² .................... H04B 11/00; G08B 13/22
[52] U.S. Cl. .............................. 340/16 R; 340/566
[58] Field of Search .............. 340/16 R, 261, 258 D, 340/15

[56] References Cited

U.S. PATENT DOCUMENTS 3,922,663  11/1975  Lubke et al. .................... 340/261

Primary Examiner—Richard A. Farley
Attorney, Agent, or Firm—Nathan Edelberg; A. Victor Erkkila; Max Yarmovsky

[57] ABSTRACT

A rate sensitive system for a seismic sensing pedestrian range containment device monitors the shift in relative energy of a footstep as a function of footstep rate. A rate sensitive relative energy measurement circuit operates in conjunction with the detection of human footsteps and classification of personnel to limit the detection range of a seismic sensor to specific distance range.

4 Claims, 1 Drawing Figure

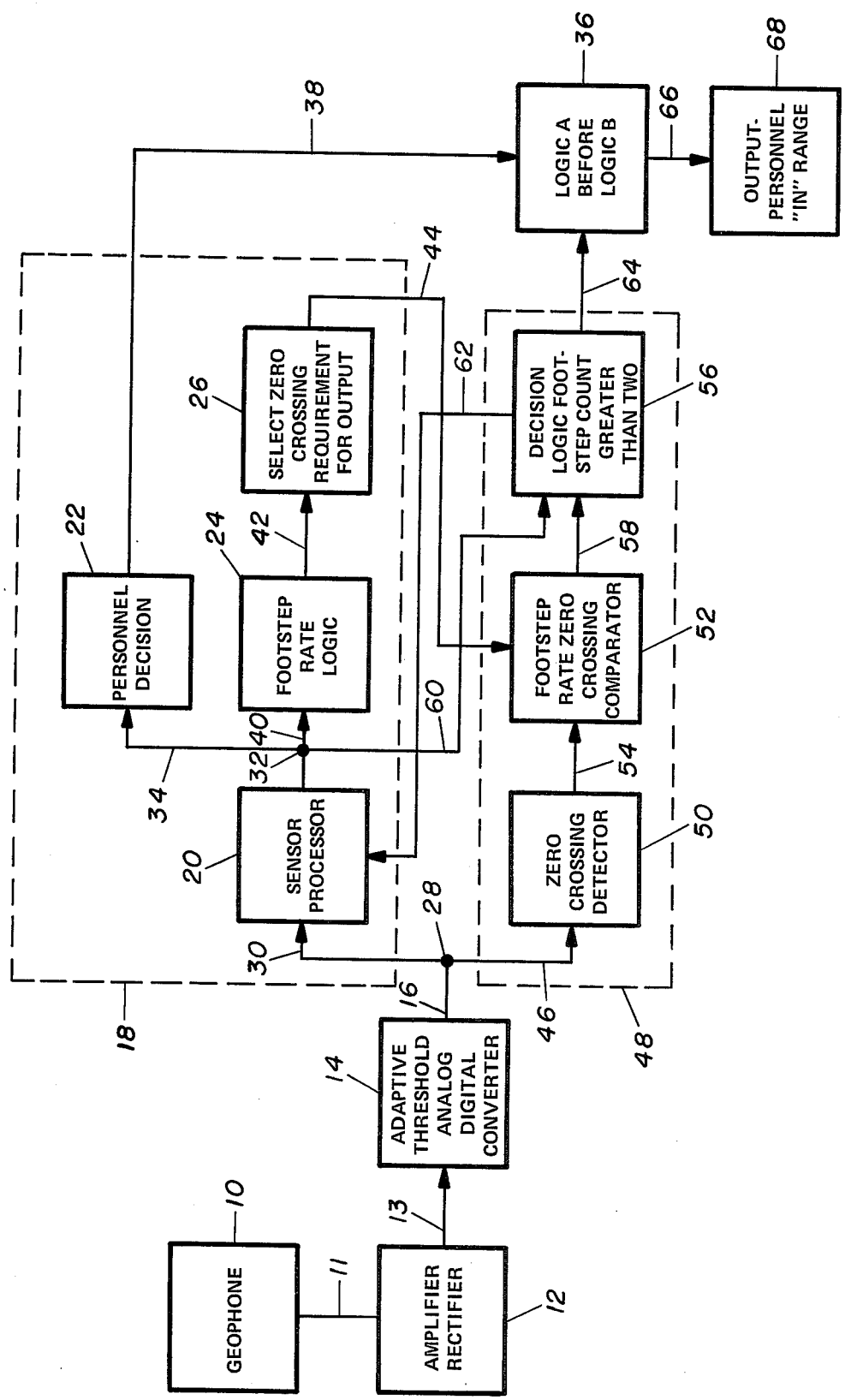

RATE SENSITIVE SYSTEM FOR A SEISMIC SENSING RANGE CONTAINMENT APPARATUS

GOVERNMENTAL INTEREST

The invention described herein was made in the course of a contract with the Government and may be manufactured, used and licensed by or for the Government for governmental purposes without the payment to us of any royalty thereon.

This application is a continuation-in-part of a prior application, Ser. No. 618,104 filed on Apr. 28, 1976 now abandoned, of C.P. Varecka et al for a Rate Sensitive System for a Seismic Sensing Range Containment Apparatus.

BACKGROUND OF THE INVENTION

Various means have been used in prior art military applications to detect the presence and depth of penetration of an enemy intruder into a given land area. These devices are used to activate an explosive device so that it will have maximum lethal effect against an enemy. One of the problems commonly associated with devices utilizing seismic sensing has been the device's ability to cope with tremendous signal strength variations which are generally generated as a function of differing soil propagation conditions and changing target speed. When this problem is applied to the requirement of target sensing, it frequently causes very large variations in the detection range of a seismic sensor. In addition, variations in intruder size and speed coupled with changing soil conditions have been found to cause variations in sensing range of 20 to 1.

SUMMARY OF THE INVENTION

The present invention relates to an electrical rate sensitive system for a seismic sensing containment device. The present device utilizes a relative energy technique for range containment to compensate not only for soil propagation variations but also for sensing range variations associated with intruder speed. The increased capability of relative energy range containment is accomplished by making the shift in footstep energy requirements a function of the footstep rate. In the present invention, running intruders require a larger shift in footstep energy before an "in range" signal is obtained than for a slow moving target where a smaller shift in footstep energy is required before an "in range" signal is obtained.

An object of the present invention is to provide a rate sensitive system for a seismic sensing containment device.

Another object of the present invention is to provide a rate sensitive system for a seismic sensing containment device which utilizes an electrical logic circuit to monitor a shift in relative energy of footsteps as a function of footstep rate.

Another object of the present invention is to use a relative energy technique in a seismic sensing range containment device which permits operation of the seismic sensor with substantially constant detection range for a variety of soil propagation variables.

A further object of the present invention is to provide a rate sensitive system for a seismic sensing containment device, such as used in anti-personnel mine applications, which permits detonation of a mine only when personnel intruders are within a lethal range of the mine.

For a better understanding of the present invention, together with other and further objects thereof, reference is made to the following descriptions taken in connection with the accompanying drawings.

BRIEF DESCRIPTION OF THE DRAWING

The drawing is a block diagram of a rate sensitive circuit used for seismic sensing in a pedestrian range containment apparatus.

DESCRIPTION OF THE PREFERRED EMBODIMENTS

Referring now to the drawing, a geophone 10 is electrically coupled via conductor 11 to an amplifier-rectifier 12 which has its output electrically coupled via electrical line 13 to an adaptive threshold analog-digital converter circuit 14 after the transducer element of the geophone 10 is placed within or upon the earth. A geophone, such as model L14B, manufactured by Mark Products, Houston, Tex., is capable of receiving seismic vibrations through the earth from a short range produced by a physical disturbance such as a person walking. The geophone 10 converts mechanical displacements caused by a seismic vibration into proportional electrical paths. These electrical signals are called footstep signatures when the frequency, amplitude, and wave shape of the electrical signal are related to a specific seismic disturbance, such as a person walking. The amplifier-rectifier 12 amplifies and full wave rectifies the AC signals from microvolts to millivolts within a limited bandpass frequency. The purpose of the adaptive threshold analog-digital converter 14 is to set the threshold value of a triggering circuit therein as a function of the amplitude of an ambient seismic background noise level and an incoming signal generated by an intruder. A minimum noise level is rejected by the fixed threshold in the analog-digital converter 14. The minimum threshold is set when an intrusion footstep signature first occurs. The adaptive threshold circuit is designed so that as the intruder approaches toward the geophone 10, the footstep seismic signature signal itself causes the threshold value of the trigger circuit to increase. The increasing of the threshold detector level by the footstep signature causes the duration of the footstep pulse width to be normalized with respect to distances. When the intruder is far from the sensor of geophone 10, the full width of the seismic footstep pulse is detected. As the intruder gets closer to the sensor of geophone 10, only a portion of the actual footstep width is detected because the level of the threshold has been increased by the intruder's signature itself. Noise levels above the minimum threshold are integrated (adapted) to a new noise background in which the system is operating. Pertinent signatures above the adapted threshold response value will generate an output signal from the analog to digital converter 14 which is digital. The digital output of the adaptive threshold analog to digital converter 14 is electrically coupled via electrical conductor 16 to two parallel logic blocks. In the first instance the output signal of the adaptive threshold 14 is routed to a personnel classification logic circuit which is enclosed within dash line box 18. The personnel classification logic circuit recognizes individual footsteps by examining their time of duration between disturbances. These individual footsteps are counted until a predetermined number is achieved. When this predetermined number is achieved the seismic signature is classified by the circuit as belonging to an individual. The personnel classification logic circuit enclosed by dash line 18 comprises a sensor processor circuit 20, a personnel decision logic circuit 22, a footstep rate logic circuit 24, and a select zero crossing requirement for output circuit 26. The sensor processor circuit 20 is electrically connected to the output of the adaptive threshold analog-digital converter 14 at junction point 28 via electrical conductor 30. The sensor processor 20 circuitry functions as a pulse stretcher, once the input to the analog digital converter 14 is triggered the output from the sensor processor 20 stays high for 40 milliseconds. In the event that another input occurs to the analog digital converter 14 before the sensor processor 20 has timed out (40 milliseconds), the sensor processor 20 timing is started anew and is available to perform its function. However, if a second input pulse does not occur to the analog digital converter 14 within 40 milliseconds the sensor processor 20 will go into its low output state. The output is one digital output pulse (representing one footstep) per footstep envelop. Personnel decision classifier circuit 22 has its input electrically connected to the output of sensor processor 20 at junction point 32 via conductor 34. The personnel decision circuit 22 consists of a logic timer and counter circuits. The personnel decision logic circuit 22 performs the function of classifying individual pulses as footsteps by monitoring the duration of the pulse disturbance and the time interval between pulse disturbances. When a disturbance occurs, it is sensed by geophone 10, amplified by amplifier rectifier 12 and fed to the adaptive threshold analog digital converter 14 via conductor 13 as previously aforedescribed. If the amplitude of the output pulse of the amplifier rectifier 12 is sufficiently large, the adaptive threshold level of the adaptive threshold analog digital converter 14 is exceeded causing an output pulse to be generated via electrical conductor 16 and 30 sufficient to trigger sensor processor 20. The triggering of sensor processor 20 is counted as a footstep in the counter circuitry of the personnel decision section 22. The input of the personnel decision 22 cannot be triggered again until the sensor processor 20 has timed out as aforedescribed. Subsequent triggerings of the sensor processor 20 will be counted by the counter circuitry of the personnel decision 22 as footsteps. In addition to counting the triggering input pulses to the personnel decision circuit 22 as footsteps additional digital logic circuitry contained therein examines the total time duration that the signal processor stays high as well as the time between successive triggerings of the sensor processor 20. If the sensor processor 20 stays up longer than 400 milliseconds, or the time between successive triggers is longer than 1.5 seconds, an "error" is counted. If five footsteps are counted before two errors occur, the train of pulses is classified by the logic circuitry of the personnel decision 22 as being caused by personnel movement. The circuit counts the number of digital input pulses received from sensor processor 20 and the time between input pulses. A correct footstep is recognized by applying a maximum and minimum time duration requirement to the output of the sensor processor 20. If the time between input pulses is greater than 400 msec and less than 1.5 seconds, a valid footstep (input pulse) is recognize. If the output of the sensor processor 20 stays high for greater than 400 milliseconds, the source of the disturbance is considered to be too long or intense to be caused by personnel movement. The disturbance is then classed as an "error" rather than as a footstep. If the time between successive triggering of the sensor processor 20 is longer than 1.5 seconds, the nature of the disturbance is considered random and an "error" is also counted. Footsteps are recognized when successive disturbances are less than 400 milliseconds and occur at a rate more often than every 1.5 seconds. Valid footsteps are counted. When 5 footsteps are counted, an output latch is set and an output signal provided to logic A before logic B 36 by conductor 38. It has been experimentally determined that 5 counted footsteps meeting the requirements of the sensor processor 20 will establish the signal signature as that of an individual. Personnel approaching the sensor from any angle are recognized by the sensor processor 20 by a buildup of the signature duration. If the first footstep is of three or more "zero crossings", where a "zero crossing" is defined as the firing of a pulse of fixed duration from the sensor processor 20 during the footstep disturbance, the signal is considered to be the signature of something other than personnel approaching. When the personnel decision circuit 22 establishes that the footsteps are that of an individual a logic A output signal is generated and delivered to logic A before logic B circuit 36 via conductor 38. Also after footstep recognition by the sensor processor 20, the occurrence of a footstep causes a signal to be urouted to the input of footstep rate determining logic 24 via electrical conductor 40. The footstep rate logic circuit 24 comprises a 3.5 second timer, a counte and decoding logic for counts of three or less, four, five and eight. The 3.5 second timer is enabled in the footstep rate logic circuit 24 when the first footstep signal is recognized by the sensor processor 20. The timer of footstep rate logic 24 continues to record for a fixed period. The number of footsteps that occur during the 3.5 second timer interval determine the footstep rate. The footstep signals of the sensor processor 20 are related by the footstep rate logic circuit 24 to a fixed period as a means of measuring the velocity of the intruder. The rate of occurrence of footsteps is then used to select the zero crossing criteria for an in range indication. The output of the decoded count from the footstep rate logic 24 is sent to the select zero crossing requirement logic via conductor 42. The relative energy requirement for an "in range" indication is selected as function of the footstep rate by the select zero crossing requirement for output circuit 26. Circuit element 26 comprises a set of logic gates that are enabled depending upon the number of footsteps that occur during this 3.5 second interval, a "3" output from the footstep counter therein is used to enable a decision circuit that requires three or more zero crossings to occur within a footstep for an in-range indication. If "4? steps occur, then 4 zero crossings are required etc. Three zero crossings are required for three footsteps, four zero crossings for four footsteps, five zero crossings for five footsteps and six zero crossings for eight footsteps. The required number 3, 4, 5 and 6 as specified above of zero crossings is provided to the footstep rate zero crossing comparator 52 via conductor 44. Footstep rate zero crossing comparator 52 function comprises a digital logic decoder function that is driven by the output of circuit element 26. Comparator 52 counts the number of zero crossings that occurs within a footstep. If the number is equal to or greater than that required by element 26, the comparator 52 is successfully triggered. After the relationship of footstep duration to footstep rate, which is expected at a given range from the geophone 10, is set, the select-zero crossing requirement circuit 26 will wait to see if the intruder passes within range and meets the duration level required and if these conditions are met it then will provide an electrical output signal via electrical conductor 44 to the input of a footstep rate zero crossing comparator 52.

A second route which the output signal of the adaptive threshold 14 detected signal takes is via conductor 46 to the energy detector logic circuity enclosed within dash line box 48. Here the relative energy of the seismic footstep signature is measured in terms of the number of "zero crossings" contained within the individual footstep disturbance. A zero crossing detector circuit 60 has its input electrically coupled to the output of the adaptive threshold analog digital converter 14 by conductor 46. The zero crossing detector generates a one-shot digital signal of a fixed duration for each full wave rectified signal received from the output of the amplifier-rectifier 12 which exceeds the threshold in the analog to digital converter 14. The number of times that the one-shot zero crossing detector circuit is fired gives the number of zero crossings associated with an individual footstep disturbance. The aforementioned footstep rate zero crossing comparator 52 is electrically connected to the output of the zero crossing detector 50 via conductor 54. The footstep rate zero crossing comparator 52 consists of a counter that counts the number of digital pulses (zero crossings) from the zero crossing detector 50. When the count exceeds the level set by the select zero crossing requirement for output circuit 26, and no errors or resets have occurred, a decision is made by comparator 52 by generating an output signal. A target is defined to be within a specified sensing range when the number of "zero crossings" is greater than the zero crossing requirement selected as a function of the footstep rate. The output of footstep rate zero crossing comparator 52 is electrically coupled to decision logic footstep count greater than two circuit 56 via electrical conductor 58. In addition, the output of sensor processor 20 is electrically connected to decision logic footstep count 56 via conductor 60. Decision logic footstep count greater than two 56 is a two stage counter that counts error signals. An error signal consisting of a digital pulse provided by sensor processor 20 via conductor 60 if the time between footsteps is grater than 1.5 seconds or the duration of the footstep is greater than 400 milliseconds. If two error signals are counted before the output of the footstep rate zero crossing comparator occurs, the system is reset by a reset signal sent via conductor 62. Decision logic count greater than two circuit 56 makes a decision which establishes whether there are erroneous electrical signatures for the footsteps, such as steps too close together or of too long duration. Decision logic circuit 56 permits two errors during a five step decision making process before the system is reset by a reset signal sent via conductor 62. Decision logic circuit 56 also measures the last two footsteps time period to establish if the pedestrian rate is based on a running person and then only detecting every other step. The output of decision logic 56 is electrically coupled to logic A before logic B 36 via conductor 64. Logic A before Lobic B comprises a 4013 dual flip flop such as manufactured by RCA of Sommerville, N.J., that provides an output signal when a signal is received from personnel decision logic 22 (logic A) and decision logic footstep count greater than two 56 (logic B) and logic A condition occurs before logic B. Logic A or logic A before logic B 36 establishes that the footstep signature is personnel before logic B establishes that the personnel are within range.

The satisfaction of both logic A and B indicates that personnel are within the lethal range of the explosive device, not shown, and an output signal is sent via electrical conductor 66 to the output-personnel "in" range circuit 68 which will than actuate the explosive. If a personnel classification has not already been made, in "in range" indication is ignored until a personnel classification is made.

While there has been described and illustrated specific embodiments of the invention, it will be obvious that various changes, modifications and additions can be made herein without departing from the field of the invention which should be limited only by the scope of the appended claims.

Having thus fully described the invention, what is claimed as new and desired to be secured by Letters Patent of the United States is:

1. A rate sensitive system for a seismic sensing range containment device to detect the presence of pedestrian intruders which comprises:

transducer means for receiving seismic vibrations in response to footsteps of a pedestrian and for generating an electrical footstep output signal in response to said seismic vibrations;

amplifier-rectifier means electrically coupled to said transducer means for amplifying and rectifying said footstep output pulse;

an adaptive threshold analog-digital converter means, electrically coupled to said amplifier-rectifier means having a threshold value responsive to the amplitude of an ambient seismic background noise level and for being responsive to said footstep output signal generated by said seismic vibrations of said pedestrian intruders, and for generating a digital output signal foot-step signature in response thereto;

personnel classification logic means, electrically coupled to said adaptive threshold analog-digital converter means, for recognizing, counting, and classifying said digital output signals generated in response to individual footsteps of said intruders and for generating an output logic A signal in response to said footsteps;

energy detector loic means, electrically to said adaptive threshold analog-digital converter means and to said personnel classification logic means, for measuring the relative energy contained in said seismic vibrations of said footsteps in terms of a number of "zero crossings" contained within said seismic vibrations of said individual footsteps, said pedestrian intruders being defined as being within a specified sensing range of said range containment device when a number of zero crossings is greater than a zero crossing requirement selected as a function of a footstep rate, and for generating an output logic B signal when said number of zero crossings is greater than said zero crossing requirement selected as a function of said footstep rate; and logic A before logic B circuit means, electrically coupled to said personnel classification logic means and said energy detector logic means, for generating an "in range" output signal when said personnel classification logic means has identified a personnel seismic signature within said speicified sensing range of said containment device prior to said energy detector means generating said logic B signal.

2. An apparatus as recited in claim 1 wherein said transducer means comprises a geophone.

3. An apparatus as recited in claim 1 wherein said personnel classification logic means comprises:
- a sensor processor circuit electrically connected to said digital output signal of said adaptive threshold means, said sensor processor circuit recognizing said digital output signal signature by frequency, pulse duration and repetition rate and generating a sensor processor output pulse in response to said digital signal;
- a personnel decision classifier circuit electrically coupled to the output of said sensor processor for determining whether said seismic vibrations are those of said pedestrian intruders and for generating a logic A output signal in response thereto;
- a footstep rate logic circuit, electrically connected to the output of said sensor processor, for measuring said sensor processor output pulses over a fixed period of time as a means of measuring the velocity of said intruders; and
- a select zero crossing requirement for output circuit, electrically coupled to said footstep rate logic circuit, selects and sets a relative energy requirement for an "in range" indication as a function of footstep duration and footstep rate and provides an electrical output signal when said intruder is within said "in range".

4. An apparatus as recited in claim 3 wherein said energy detecor logic means comprises:
- a zero crossing detector circuit, electrically coupled to said adaptive threshold analog-digital converter means, which generates a one-shot digital signal of a fixed duration for each full wave recitified signal from said amplifier-rectifier which exceeds said threshold value of said analog-digital converter means, and wherein the number of times that said zero crossings detector generates a one-shot digital signal is a function of the number of zero crossings associated with an individual footstep disturbance;
- a footstep rate zero crossing comparator, electrically coupled to the output of said zero crossing detector and said select zero crossing requirement for output circuit, which measures a number of zero crossing counts generated by said zero crossing detector, and when a count exceeds a level set by said select zero crossing requirement for output circuit and no error or reset signals have been received by said sensor processor, said comparator generates an output signal based on the footstep rate of said pedestrian intruder;
- a decision logic footstep count greater than two circuit, electrically connected to said footstep rate zero crossing comparator and to said sensor processor, for determining whether said electrical footstep signatures are of proper frequency and duration, and which permits two error signatures during a five step decision making process before said decision logic footstep count generates a reset signal, and which generates said output logic B signal when said pedestrian is within range of said contaiment device.

* * * * *